(12) United States Patent
Mixon

(10) Patent No.: US 10,733,216 B2
(45) Date of Patent: Aug. 4, 2020

(54) INTERACTIVE MAP

(71) Applicant: William D. Mixon, Anna Maria, FL (US)

(72) Inventor: William D. Mixon, Anna Maria, FL (US)

( * ) Notice: Subject to any disclaimer, the term of this patent is extended or adjusted under 35 U.S.C. 154(b) by 180 days.

(21) Appl. No.: 15/985,602

(22) Filed: May 21, 2018

(65) Prior Publication Data

US 2018/0336225 A1 Nov. 22, 2018

Related U.S. Application Data

(60) Provisional application No. 62/509,236, filed on May 22, 2017.

(51) Int. Cl.
| | |
|---|---|
| *G06F 16/29* | (2019.01) |
| *G06Q 30/02* | (2012.01) |
| *G06Q 50/00* | (2012.01) |
| *G06F 3/0484* | (2013.01) |

(52) U.S. Cl.
CPC ......... *G06F 16/29* (2019.01); *G06Q 30/0201* (2013.01); *G06Q 50/01* (2013.01); *G06F 3/04842* (2013.01)

(58) Field of Classification Search
CPC . G06F 16/29; G06F 3/04842; G06Q 30/0201; G06Q 50/01
See application file for complete search history.

(56) References Cited

U.S. PATENT DOCUMENTS

| | | | | |
|---|---|---|---|---|
| 8,302,033 B2* | 10/2012 | Matas | ............... | G01C 21/20 |
| | | | | 715/863 |
| 9,043,134 B2* | 5/2015 | Rosekrans | ......... | G01C 21/3469 |
| | | | | 701/409 |
| 9,158,414 B1* | 10/2015 | Gluzberg | ............. | G06F 3/0418 |
| 2011/0264370 A1* | 10/2011 | Jakobson | ........... | G01C 21/3682 |
| | | | | 701/533 |
| 2012/0159371 A1* | 6/2012 | Thrapp | ............... | G06F 16/29 |
| | | | | 715/772 |
| 2014/0199970 A1* | 7/2014 | Klotz | ............... | H04W 12/02 |
| | | | | 455/411 |
| 2014/0365934 A1* | 12/2014 | Moore | ............... | G06F 3/04815 |
| | | | | 715/769 |
| 2016/0004723 A1* | 1/2016 | Pretel | ................ | G06F 16/29 |
| | | | | 707/769 |
| 2016/0127485 A1* | 5/2016 | Tseng | ............... | H04W 4/21 |
| | | | | 709/205 |
| 2018/0176166 A1* | 6/2018 | Philipson | ............ | H04W 4/02 |

\* cited by examiner

*Primary Examiner* — Calvin Cheung
(74) *Attorney, Agent, or Firm* — Wilson Dutra, PLLC; Camille A. Wilson

(57) ABSTRACT

The present disclosure provides a system that collects customer data in a way that creates a shared experience. More specifically, an interactive map for customer engagement is provided. In some embodiments, this information may be displayed at the establishment for other customers to view. This system and method may receive and save addresses to show where customers may originate from. Displaying an interactive map may allow a company to gather data from their customers while engaging the customers in a social sharing platform. This may increase the likelihood that a customer may provide the data and increase a sense of community within a customer pool.

18 Claims, 10 Drawing Sheets

INTERACTIVE MAP

CROSS-REFERENCE TO RELATED APPLICATION

This application claims priority to and the full benefit of U.S. Provisional Patent Application Ser. No. 62/509,236, filed May 22, 2017, and titled "INTERACTIVE MAP", the entire contents of which are incorporated in this application by reference.

BACKGROUND OF THE DISCLOSURE

The advent of the internet has facilitated different ways for companies to measure their performance as well as the reach of their brands or experience. For example, a consumer may use a search engine to find a location, see how it has been rated, and compare these ratings or the location to whatever people in their social spheres do. Companies can run analytics to measure how they are performing in the market and tweak their messaging accordingly. Consumers can make more informed decisions as to how and where they want to spend their time.

As a company's reach grows exponentially, so too does the need to capture each consumer's information. Customer resource management provides a small piece for companies to maintain contact with a consumer after they visit their location, when they make a purchase, or when they sign up to be part of continued contact, such as a mailing list. However, there exists a need to capture a consumer's information at an establishment that streamlines the process while creating a social aspect for other consumers.

Further, community support and sharing have now become an essential part of reaching, acquiring, and keeping new customers. Social media has become prolific and a desire to share experiences with a community has become the norm. Currently, the majority of ways to share an experience occur on popular social media platforms.

SUMMARY OF THE DISCLOSURE

What is needed is a system and method for an establishment that may intake a customer's information and allow customers to feel like they are sharing their experience with a community. Accordingly, the present disclosure relates to a system that collects customer data in a way that creates and fosters a shared experience. In some embodiments, this information may be displayed at the establishment for other customers to view. More specifically, an interactive map for customer engagement is provided.

In some implementations, these inputs may be set by the establishment. In some aspects, the customer may receive correspondence based on their interests or data input. This system or method may receive and save addresses to show where customers may originate from. Displaying an interactive map may allow a company to gather data from their customers while engaging the customers in a social sharing platform. This may increase the likelihood that a customer may provide the data and increase a sense of community within a customer pool. As more customer information is received, the system or method may streamline the data that is displayed so that it is easier for other customers to navigate or add their information.

In some cases, an establishment may receive hundreds of data inputs, and the interactive map may allow customers to view the data inputs in an engaging manner, such as by providing sort, filter, and preference options. In some embodiments, the system or method may determine the most relevant input that may appeal to the customers of the establishment. In some implementations, the establishment may determine what to display based on a standardized input, customer feedback, or expectation as to how many people may be providing their information on a daily basis. The system or method may provide different views based on daily, weekly, monthly, quarterly, or yearly inputs.

The present disclosure provides for a system for providing an interactive map, wherein the system may comprise a display, one or more local input interfaces, one or more memory resources comprising a user profile database, one or more processors in communication with the display, one or more local input interfaces, and one or more memory resources. In some aspects, the one or more processors are configured to receive a first set of pin data comprising at least one location, identify a first pin area, define geofence boundaries of a first pin area, display an interactive map on the display, and display a first pin in the interactive map within the first pin area.

In some embodiments, the first set of pin data may be received from one or more local input interfaces. In some aspects, the geofence boundaries of the first pin area may be based at least in part on city limits of at least one location. In some implementations, one or more processors may be configured to receive a second set of pin data, identify a second pin area, and define geofence boundaries of a second pin area. In some aspects, one or more processors may be configured to display a second pin in the interactive map within the second pin area.

In some implementations, one or more processors may be configured to remove the first pin from the interactive map. In some embodiments, one or more processors may be configured to compare the first pin area to the second pin area, wherein the comparing identifies a proximity between the first pin area and the second pin area, and define geofence boundaries of a third pin area based on the comparing of the first pin area and the second pin area, wherein the defining occurs where the proximity is less than a predefined threshold distance.

In some aspects, one or more processors may be configured to receive display preferences, wherein providing the interactive map is based at least in part on the display preferences. In some embodiments, one or more processors may be configured to associate one or more pin types with the first set of pin data, wherein the first pin is displayed according to at least one of the one or more pin types. In some embodiments, the first set of pin data may comprise at least one association.

The present disclosure relates to a method for displaying an interactive map comprising the method steps of receiving a first set of pin data comprising at least one location, identifying a first pin, defining geofence boundaries of a first pin area, displaying an interactive map on the display, and displaying a first pin in the interactive map within the first pin area. In some embodiments, the geofence boundaries of the first pin area may be based at least in part on city limits of at least one location. In some aspects, the first set of pin data may be received from one or more local input interfaces.

In some embodiments, the method may comprise the method steps of receiving a second set of pin data, identifying a second pin area, and defining geofence boundaries of a second pin area. In some implementations, the method may comprise the method steps of displaying a second pin in the interactive map within the second pin area. In some aspects, the method may comprise the method steps of removing the first pin from the interactive map.

In some embodiments, the method may further comprise the method steps of comparing the first pin area to the second pin area, wherein the comparing identifies a proximity between the first pin area and the second pin area, and defining geofence boundaries of a third pin area based on the comparing of the first pin area and the second pin area, wherein the defining occurs when the proximity is less than a predefined threshold distance. In some aspects, the method may comprise the method steps of receiving display preferences, wherein providing the interactive map is based at least in part on the display preferences. In some embodiments, the method may comprise the method steps of associating one or more pin types with the first set of pin data, wherein the first pin is displayed according to at least one of the one or more pin types. In some implementations, the first set of pin data comprises at least one association.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for a system that collects customer data in a way that creates a shared experience. More specifically, an interactive map for customer engagement is provided. In some embodiments, this information may be displayed at the establishment for other customers to view. This system and method may receive and save addresses to show where customers may originate from. Displaying an interactive map may allow a company to gather data from their customers while engaging the customers in a social sharing platform. This may increase the likelihood that a customer may provide the data and increase a sense of community within a customer pool.

In the following sections, detailed descriptions of examples and methods of the disclosure will be given. The description of both preferred and alternative examples, though thorough, are exemplary only, and it is understood that to those skilled in the art variations, modifications, and alterations may be apparent. It is therefore to be understood that the examples do not limit the broadness of the aspects of the underlying disclosure as defined by the claims.

Glossary

Pin Type: as used herein refers to an appearance of a pin on an interactive map. In some aspects, the pin type may be different based on predefined parameters. For example, the default pin type may comprise a typical pin shape, and the pin type may comprise a flag for those who indicate they served in the armed forces. In some embodiments, pin types may vary within an association, such as a unique pin type for each branch of the armed forces.

Pin: as used herein refers to a digital geographic indicator. In some aspects, a pin may indicate a precise location. In some embodiments, a pin may indicate a pin area generally, such as in the center of the pin area.

Pin Area: as used herein refers to the geofencing boundaries associated with a pin. In some aspects, a pin area may be based on city limits. In some embodiments, the pin area may vary over time as more pin data may be received and processed.

Pin Data: as used herein refers to any data that may be associated with a pin. In some implementations, pin data may comprise location data, such as a home city. In some embodiments, pin data may include a visit date or other relevant data.

Interactive Map: as used herein refers to a digital display of a geographic region, such as a country, state, or city, as non-limiting examples, wherein the digital display may be modified by users, such as through input of pin data or input of preferences.

Figure 1A:
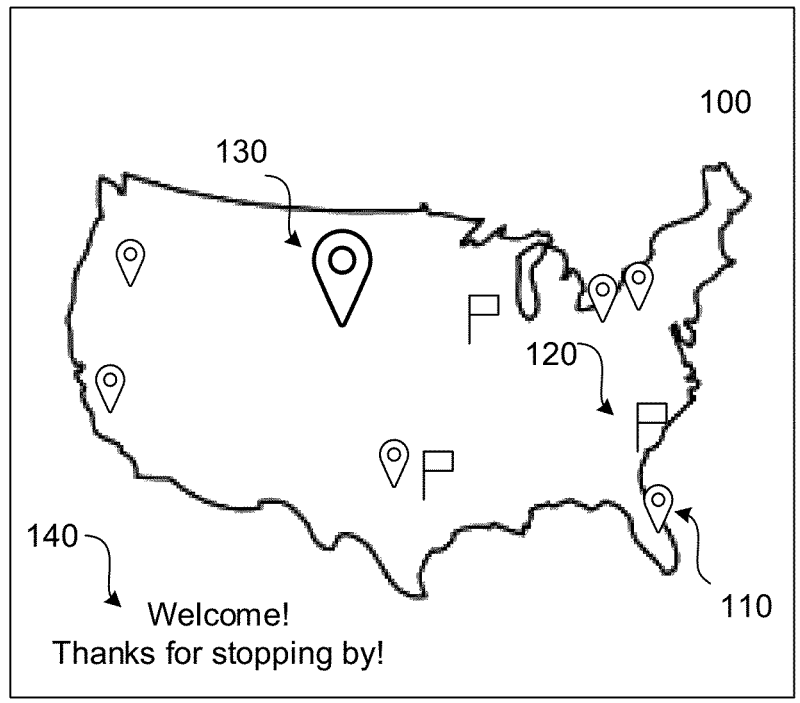
FIG. 1A illustrates an exemplary interactive map, according to some embodiments of the present disclosure.

Referring now to FIG. 1A, an exemplary interactive map 100 is illustrated. In some aspects, an interactive map 100 may comprise geographic indicators, such as country borders, state lines, or roadways as non-limiting examples. In some embodiments, the geographic segment displayed in an interactive map 100 may vary based on the needs of a company. For example, if the majority of customers for a company hail from the same state, presenting a single state with pins may create a better sense of community than would showing an entire country with a cluster of pins around the state. As another example, where a company may want to portray themselves as a global corporation, the interactive map may comprise the world, and customers may see where they fit in internationally, which may allow them to feel part of a global community.

In some implementations, an interactive map 100 may contain a plurality of pins 120, 110 based on received pin data. In some embodiments, when a new set of pin data may be received, a new pin 130 may appear on the interactive map 100 and may temporarily appear larger so that a user may be able to see their new pin 130 more easily. In some aspects, the interactive map 100 may present a general welcome message 140 when new pin data may be received.

In some embodiments, a company may be able to customize the interactive map 100, such as by including their logo. In some aspects, the company may be able to control how an interactive map 100 may cycles through information, such as menus, advertisements, or location-specific information. For example, an international company may want to cycle between global, country, and city views. As another example, a company may insert advertising or information throughout the day. In some aspects, nonprofits may be required to keep a donor list posted, which may be integrated with the interactive map 100. The donor list may be cycled through other screens. In some embodiments, the donor list may be integrated directly within the interactive map 100, such as assigning a pin type to donors and indicating where the donors may be from. In some implementations, a user may be able to select from different languages, which may allow for international engagement with the interactive map 100.

Figure 1B:
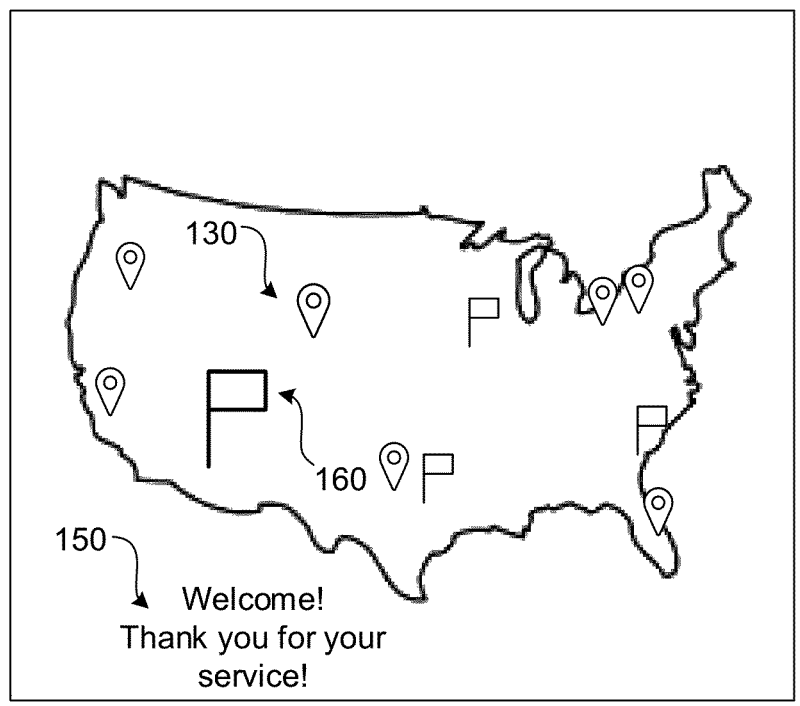
FIG. 1B illustrates an exemplary interactive map, according to some embodiments of the present disclosure.

Referring now to FIG. 1B, an exemplary interactive map 100 is illustrated. In some embodiments, the new pin 130 may become the same size as the plurality of pins 120, 110 after a predefined amount of time or once new pin data may be received. In some implementations, new pin data may indicate that a user may have an association, such as serving in the armed forces or being part of AARP, and a new flag pin 160 may appear on the interactive map 100. In some aspects, a custom welcome message 150 may be presented based on the association.

In some embodiments, the types of associations that may be collected in the pin data may depend on the company offering the interactive map 100. For example, a children's museum may prompt input of associations that may be interesting to children, such as Girl Scouts, Boy Scouts, or Boys and Girls Club. As another example, an amusement park may want to highlight the frequency of visits for any given user, and the association may be "frequent flier" for those who may have visited the location more than ten times in the past year. As another example, a convention may want to highlight the occupational diversity and prompt input of a user's occupation.

Figure 2A:
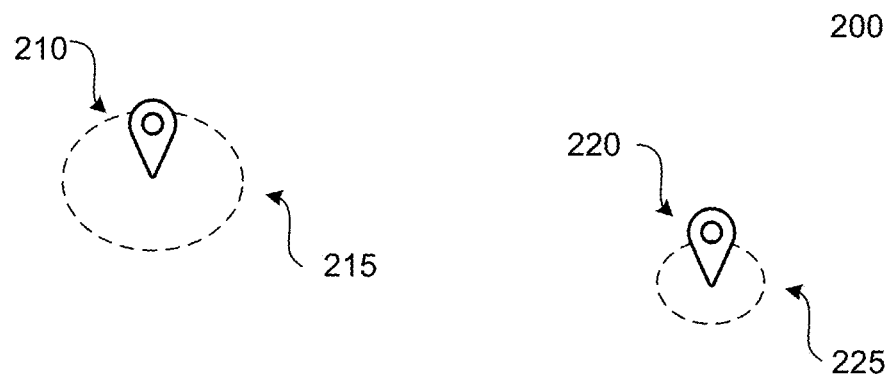
FIG. 2A illustrates a map segment with exemplary pins and pin areas, according to some embodiments of the present disclosure.

Referring now to FIG. 2A, a map segment with exemplary pins 210, 220 and pin areas 215, 225 is illustrated. In some embodiments, a rural pin 210 may be placed in the middle of a rural city limits pin area 215, and a metropolitan pin 220 may be placed in the middle of a metropolitan city limits pin area 225. In some aspects, a rural city limits pin area 215 may be larger than a metropolitan city limits pin area 225. The city pin area 225 may be smaller with a larger concentration of population, and the rural city limits pin area 225 may be more expansive with a lower concentration of population. In some implementations, the area directly outside the metropolitan city pin area 225 may be suburban towns.

Figure 2B:
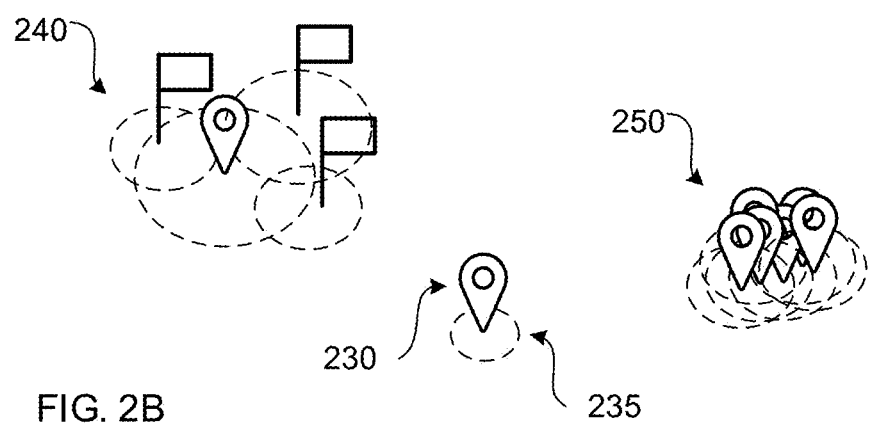
FIG. 2B illustrates a map segment with exemplary pins and pin areas, according to some embodiments of the present disclosure.

Referring now to FIG. 2B. a map segment with exemplary pins 230 and pin groupings 240, 250 is illustrated. In some aspects, an interactive map 200 may comprise multiple rural pins 240. In some embodiments, a portion of the multiple rural pins 240 may comprise a different pin type, such as flags. In some implementations, a new small town pin 230 may be placed within the small town city limit pin area 235. In some embodiments, a cluster of metropolitan and urban pins 250 may be placed on the interactive map 200.

Figure 2C:
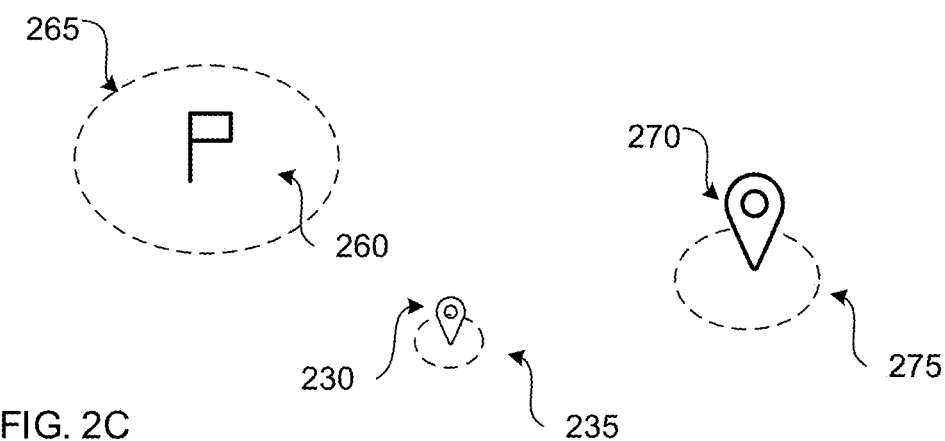
FIG. 2C illustrates a map segment with exemplary pins and pin areas, according to some embodiments of the present disclosure.

Referring now to FIG. 2C, a map segment with adjusted pin areas 265, 275 is illustrated. In some aspects, the cluster of metropolitan and urban pins 250 may be combined into a single big city pin 270 and placed in a big city pin area 275. In some embodiments, a big city pin area 275 may encompass the farthest boundaries within the cluster of metropolitan and urban pins 250. In some implementations, the big city pin area 275 may include the original metropolitan city limit pin area 225 and extend a predefined distance beyond it, wherein pins with a pin area that may overlap with that big city pin area 275 may be grouped with the big city pin 270.

In some aspects, a general rural pin 260 may be placed in a general rural pin area 265. In some embodiments, the general rural pin area 265 may encompass a larger area, such as defined by the borders of multiple rural pins 240. In some implementations, grouping pins and pin areas may allow for easier viewing of an interactive map. For example, the cluster of metropolitan and urban pins 250 may clutter the interactive map without providing more information to a user, whereas a big city pin 270 may provide similar information in a more visually conducive manner.

In some aspects, the adjusted pins may be customized to provide more information. For example, the big city pin 270 may be larger than the small town pin 230, which may indicate that more users are from the big city pin area 275 than the small town pin area 235. In some implementations, the pin type may be indicative of the majority of users from that area. For example, the majority of users in a general rural pin area 265 may have served in the armed forces, and the representative pin type may be a flag.

Figure 3A:
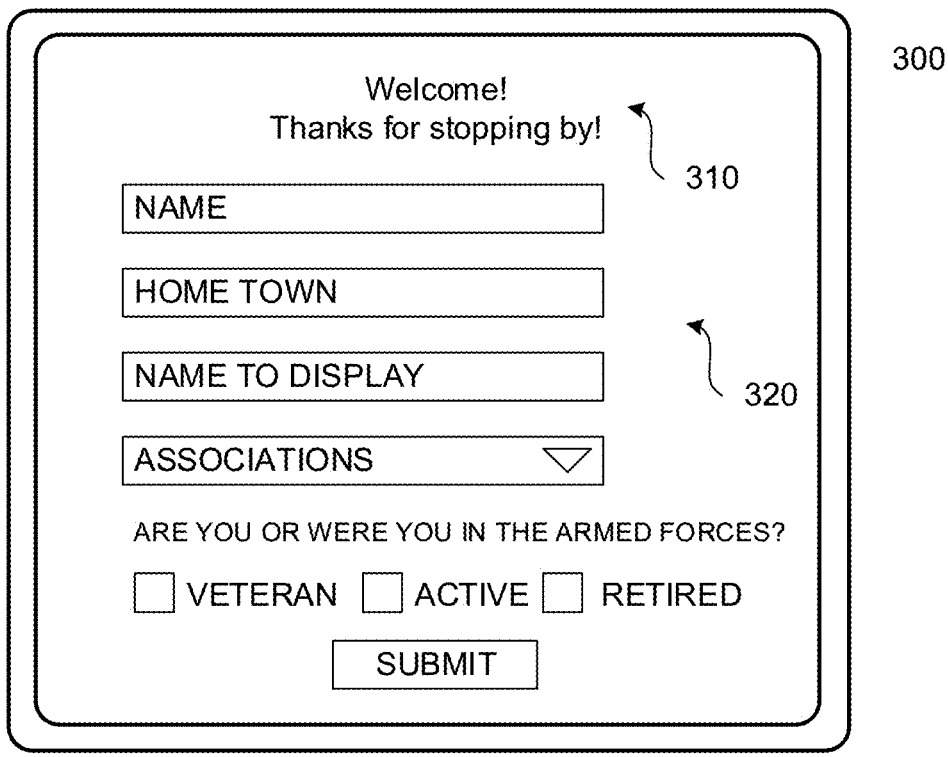
FIG. 3A illustrates an exemplary embodiment of a local input device, according to some embodiments of the present disclosure.

Referring now to FIG. 3A, an exemplary embodiment of a local input device 300 is illustrated. In some aspects, the local input device 300 may prompt for direct input of personal data. In some embodiments, the collected information may comprise pin data 320. In some implementations, not shown, the local input device 300 may collect other personal data, such as contact information, which may allow the company to integrate the customer into their customer management systems.

In some aspects, the local input device 300 may provide a welcome message 310. In some implementations, the local input device 300 may comprise a submit function. In some embodiments, the pin data 320 may include associations in a drop down menu or in a check box format.

Figure 3B:
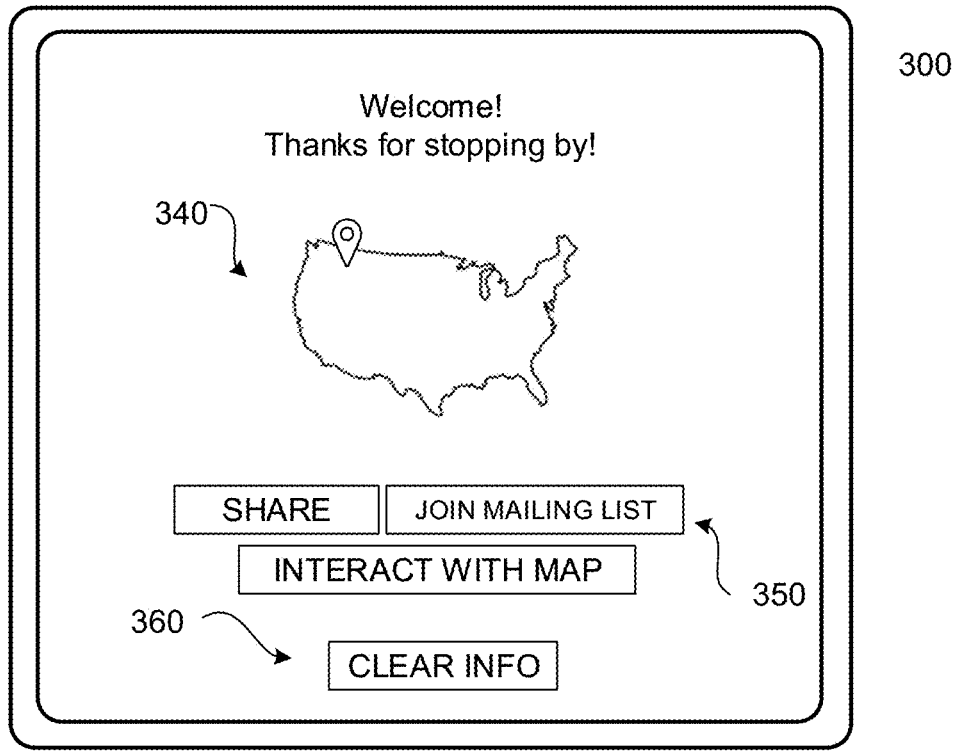
FIG. 3B illustrates an exemplary embodiment of a local input device, according to some embodiments of the present disclosure.

Referring now to FIG. 3B, an exemplary embodiment of a local input device 300 is illustrated. In some aspects, a small version of an interactive map 340 may be presented with a pin in the location from the submitted pin data 320. In some embodiments, action prompts 350 may be available to the user. For example, a user may be able to opt in to or opt out of a mailing list or share their pin data, such as through social media platforms. As another example, the user may be able to interact with the interactive map from the local input device 300. In some aspects, the local input device 300 may comprise a portable device, such as a tablet, laptop, or smartphone. In some embodiments, the local input device 300 may comprise a stationary base, such as a kiosk.

In some embodiments, a company may submit some of the personal data to a third party, which may extend the engagement opportunities. For example, the personal data may be sent to a review platform, wherein the user may receive an email prompt to leave a review of the company. In some aspects, the personal data may include a mobile phone number, and the user may be able to opt in to receiving text messages. In some embodiments, the texts may include a version of or a link to an interactive map.

In some aspects, the user may be able to clear information 360 after input of their personal data. In some embodiments, the local input device 300 may be cleared periodically after a predefined length of inactivity. In some implementations, the personal data may be cleared on the local input device 300 once a user submits their information. Allowing the user to clear information 360 may provide a sense of security so that users that directly follow may not be able to access or view the user's personal data.

In some embodiments, different locations may be linked, where pin data may be shared between the locations. For example, users may be incentivized to input their personal data at various locations by a point system, where each log in may give a user points. The points may be redeemable for rewards or badges, which may be shared through one or both the interactive map and social media. In some aspects, the local input device 300 may prompt a "club ID" that may allow the system to access previously submitted personal data. In some embodiments, the local input device 300 may comprise a scanner that may be configured to scan predefined forms of identification, such as passports or driver's licenses, which may allow for easier input of basic personal data.

In some implementations, the system may filter content, such as by removing language deemed inappropriate. For example, as a joke, a user may input a false name with vulgar words, and the system may filter or adjust the input to remove the inappropriate language. In some embodiments, the system may perform an address look up to verify locations. In some implementations, the address look up may be live wherein the user may be prompted to select from a drop down list. In some aspects, a company may customize the inputs, such as whether a location must include an entire address or just the city. In some embodiments, the input parameters may depend on the needs of the company. For example, if the address is to be used for a physical mailing, then the entire address may be useful. As another example, the address may be used to collect demographic data but correspondence may be exclusively electronic, so prompting country, city, and state may be sufficient.

Figure 4:
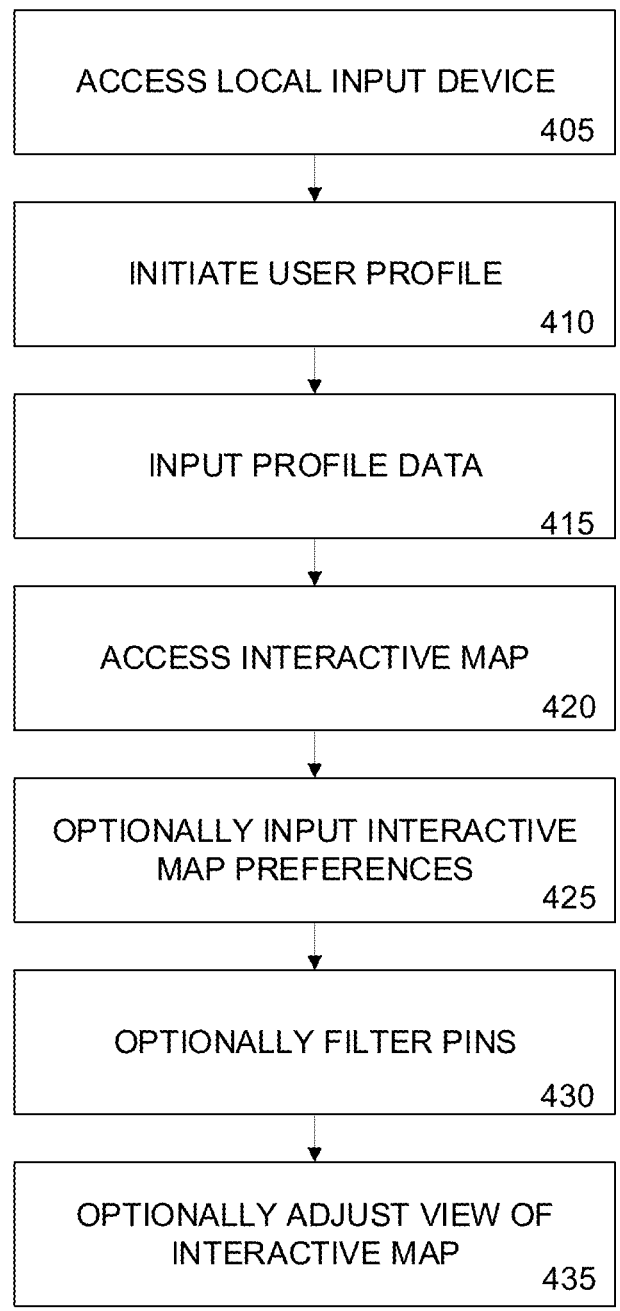
FIG. 4 illustrates exemplary method steps for interacting with an interactive map.

Referring now to FIG. 4, exemplary method steps for interacting with an interactive map are illustrated. At 405, a local input device may be accessed. At 410, a user profile may be initiated. At 415, profile data may be input. At 420, an interactive map may be accessed. In some embodiments, at 425, interactive map preferences may be input. In some aspects, at 430, pins may be filtered. In some implementations, at 435, a view of the interactive map may be adjusted.

Figure 5:
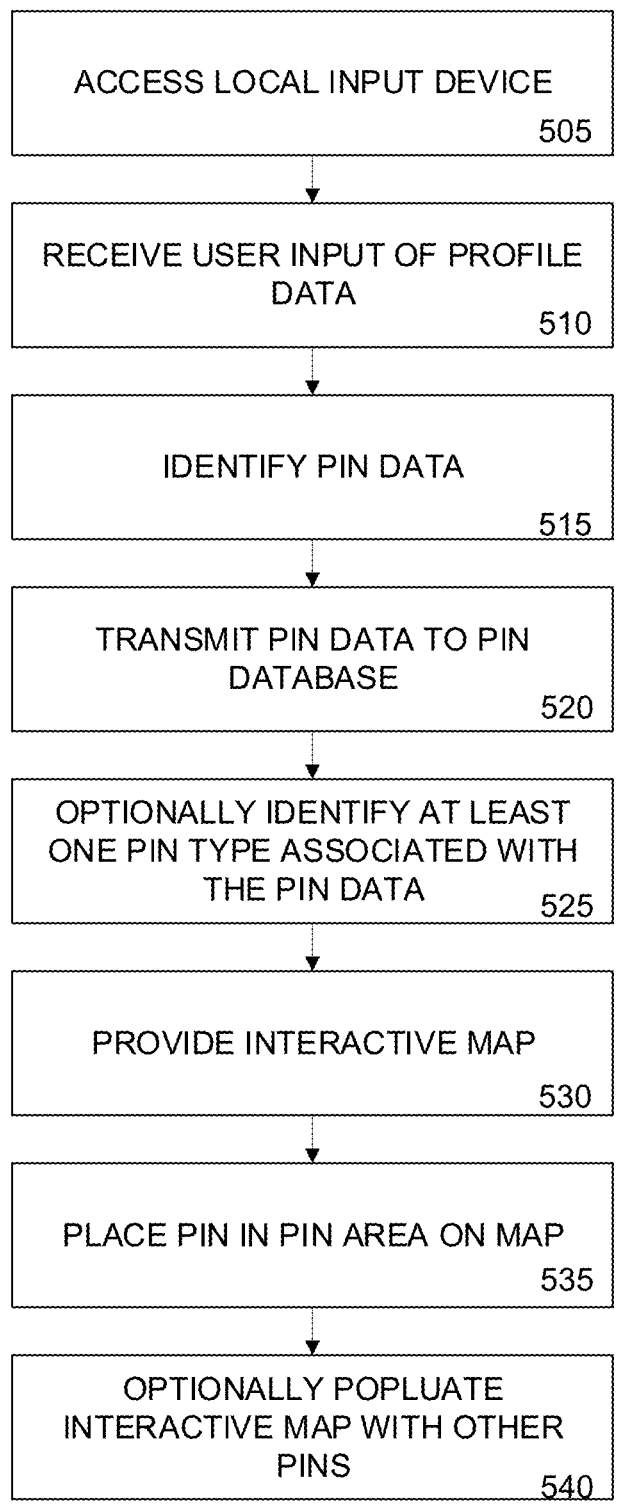
FIG. 5 illustrates exemplary method steps for providing an interactive map.

Referring now to FIG. 5, exemplary method steps for providing an interactive map are illustrated. At 505, a local input device may be accessed. At 510, a user input of profile data may be received. At 515, pin data may be identified. At 520, pin data may be transmitted to a pin database. In some embodiments, at 525, at least one pin type may be associated with the pin data at 530, an interactive map may be provided. At 535, a pin may be placed in the pin area of an interactive map. In some implementations, at 540, other pins may be populated on the interactive map.

Figure 6:
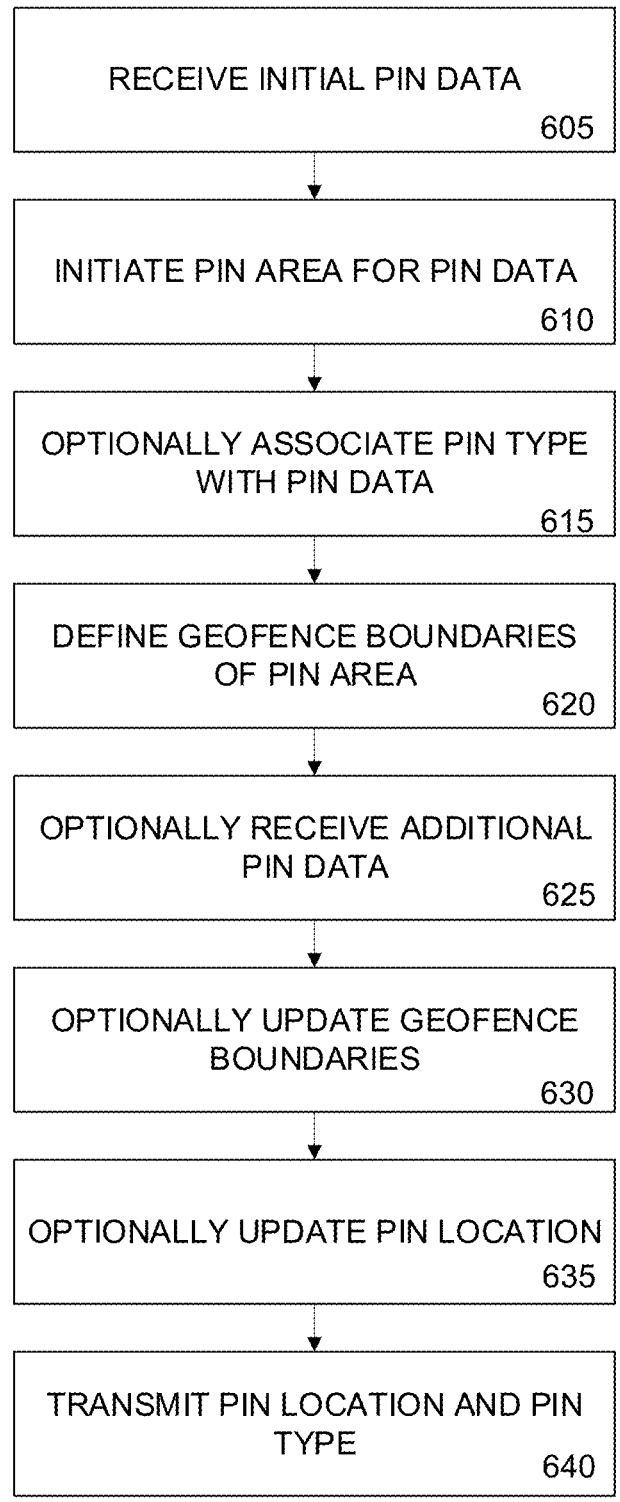
FIG. 6 illustrates exemplary method steps for defining a pin area.

Referring now to FIG. 6, exemplary method steps for defining a pin area are illustrated. At 605, initial pin data may be received. At 610, a pin area for pin data may be initiated. In some aspects, at 615, a pin type may be associated with pin data. At 620, geofence boundaries of a pin area may be defined. In some implementations, at 625, additional pin data may be received. In some embodiments, at 630, geofence boundaries may be updated. In some aspects, at 635, a pin location may be updated. At 640, a pin location and pin type may be may transmitted.

Figure 7:
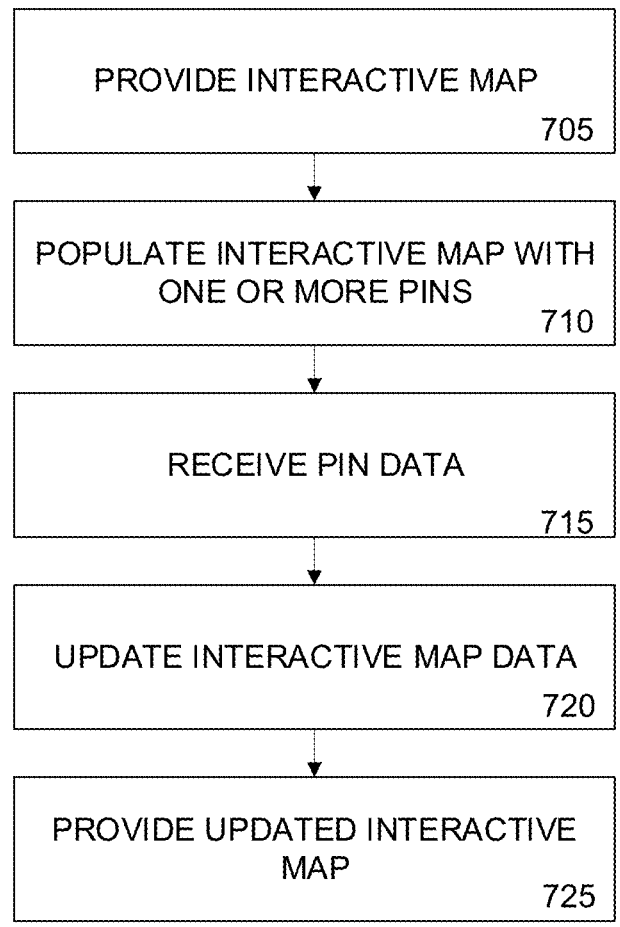
FIG. 7 illustrates exemplary method steps for updating an interactive map.

Referring now to FIG. 7, exemplary method steps for updating an interactive map are illustrated. At 705, an interactive map may be provided. At 710, an interactive map may be populated with one or more pins. At 715, pin data may be received. At 720, interactive map data may be updated. At 725, an updated interactive map may be provided.

Figure 8:
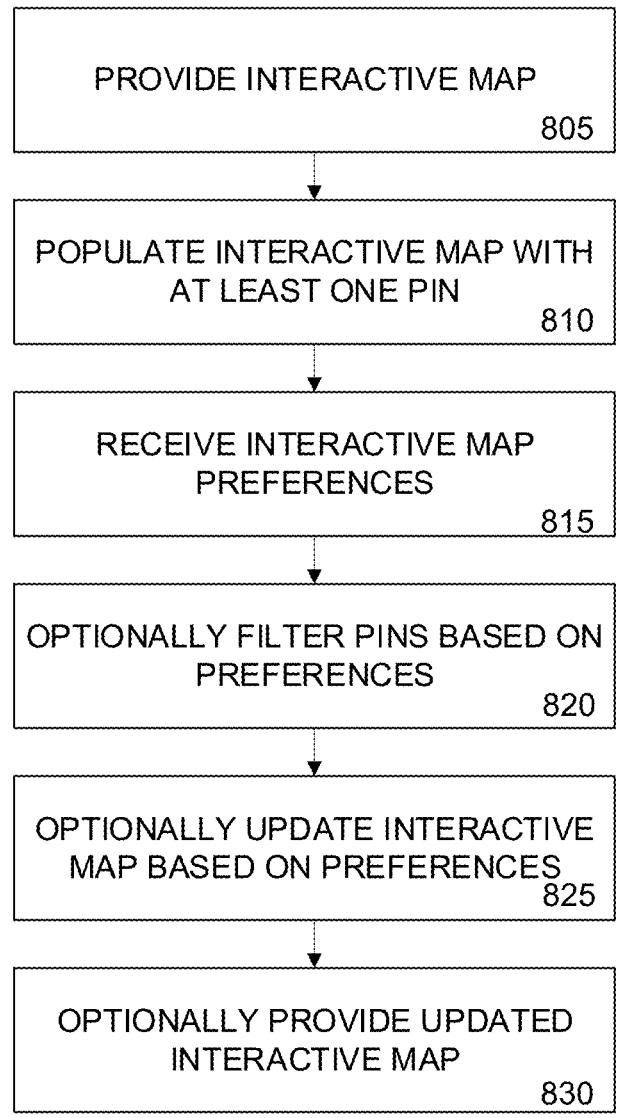
FIG. 8 illustrates exemplary method steps for providing an interactive map.

Referring now to FIG. 8, exemplary method steps for providing an interactive map are illustrated. At 805, an interactive map may be provided. At 810, an interactive map may be populated with at least one pin. At 815, interactive map preferences may be received. In some embodiments, at 820, pins may be filtered based on preferences. In some aspects, at 825, an interactive map may be updated based on preferences. In some implementations, at 830, an updated interactive map may be provided. In some embodiments, preferences and filtering abilities may include metadata associated with pin data, such as date and time of input.

For example, a company may be open from 8 am to 10 pm. Pin data may be collected throughout the day, and metadata may be collected along with the pin data. Preferences may allow a user to view day pins separately from night pins.

Figure 9:
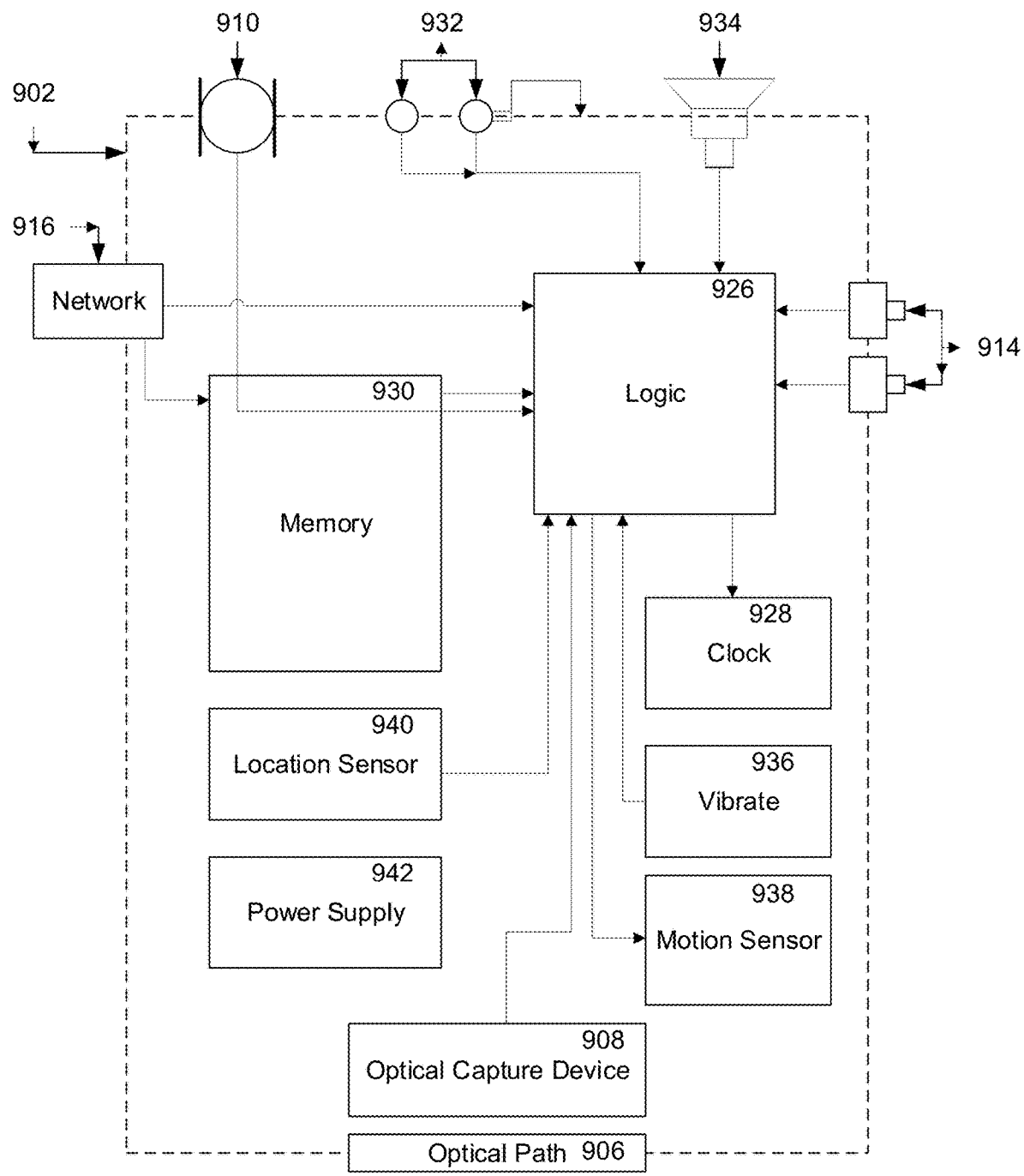
FIG. 9 illustrates an exemplary block diagram of an exemplary embodiment of a local input device.

Referring now to FIG. 9, an exemplary block diagram of an exemplary embodiment of a local input device 902 is illustrated. The mobile device 902 may comprise an optical capture device 908, which may capture an image and convert it to machine-compatible data, and an optical path 906, typically a lens, an aperture, or an image conduit to convey the image from the rendered document to the optical capture device 908. The optical capture device 908 may incorporate a Charge-Coupled Device (CCD), a Complementary Metal Oxide Semiconductor (CMOS) imaging device, or an optical sensor of another type.

In some embodiments, the mobile device 902 may comprise a microphone 910, wherein the microphone 910 and associated circuitry may convert the sound of the environment, including spoken words, into machine-compatible signals. Input facilities 914 may exist in the form of buttons, scroll-wheels, or other tactile sensors such as touch-pads. In some embodiments, input facilities 914 may include a touchscreen display. Visual feedback 932 to the user may occur through a visual display, touchscreen display, or indicator lights. Audible feedback 934 may be transmitted through a loudspeaker or other audio transducer. Tactile feedback may be provided through a vibration module 936.

In some aspects, the mobile device 902 may comprise a motion sensor 938, wherein the motion sensor 938 and associated circuity may convert the motion of the mobile device 902 into machine-compatible signals. For example, the motion sensor 938 may comprise an accelerometer, which may be used to sense measurable physical acceleration, orientation, vibration, and other movements. In some embodiments, the motion sensor 938 may comprise a gyroscope or other device to sense different motions.

In some implementations, the mobile device 902 may comprise a location sensor 940, wherein the location sensor 940 and associated circuitry may be used to determine the location of the device. The location sensor 940 may detect Global Position System (GPS) radio signals from satellites or may also use assisted GPS where the mobile device may use a cellular network to decrease the time necessary to determine location. In some embodiments, the location sensor 940 may use radio waves to determine the distance from known radio sources such as cellular towers to determine the location of the mobile device 902. In some embodiments these radio signals may be used in addition to and/or in conjunction with GPS.

In some aspects, the mobile device 902 may comprise a logic module 926, which may place the components of the mobile device 902 into electrical and logical communication. The electrical and logical communication may allow the components to interact. Accordingly, in some embodiments, the received signals from the components may be processed into different formats and/or interpretations to allow for the logical communication. The logic module 926 may be operable to read and write data and program instructions stored in associated storage 930, such as RAM, ROM, flash, or other suitable memory. In some aspects, the logic module 926 may read a time signal from the clock unit 928. In some embodiments, the mobile device 902 may comprise an on-board power supply 942. In some embodiments, the mobile device 902 may be powered from a tethered connection to another device, such as a Universal Serial Bus (USB) connection.

In some implementations, the mobile device 902 may comprise a network interface 916, which may allow the mobile device 902 to communicate and/or receive data to a network and/or an associated computing device. The network interface 916 may provide two-way data communication. For example, the network interface 916 may operate according to an internet protocol. As another example, the network interface 916 may comprise a local area network (LAN) card, which may allow a data communication connection to a compatible LAN. As another example, the network interface 916 may comprise a cellular antenna and associated circuitry, which may allow the mobile device to communicate over standard wireless data communication networks. In some implementations, the network interface 916 may comprise a Universal Serial Bus (USB) to supply power or transmit data. In some embodiments, other wireless links known to those skilled in the art may also be implemented.

Figure 10:
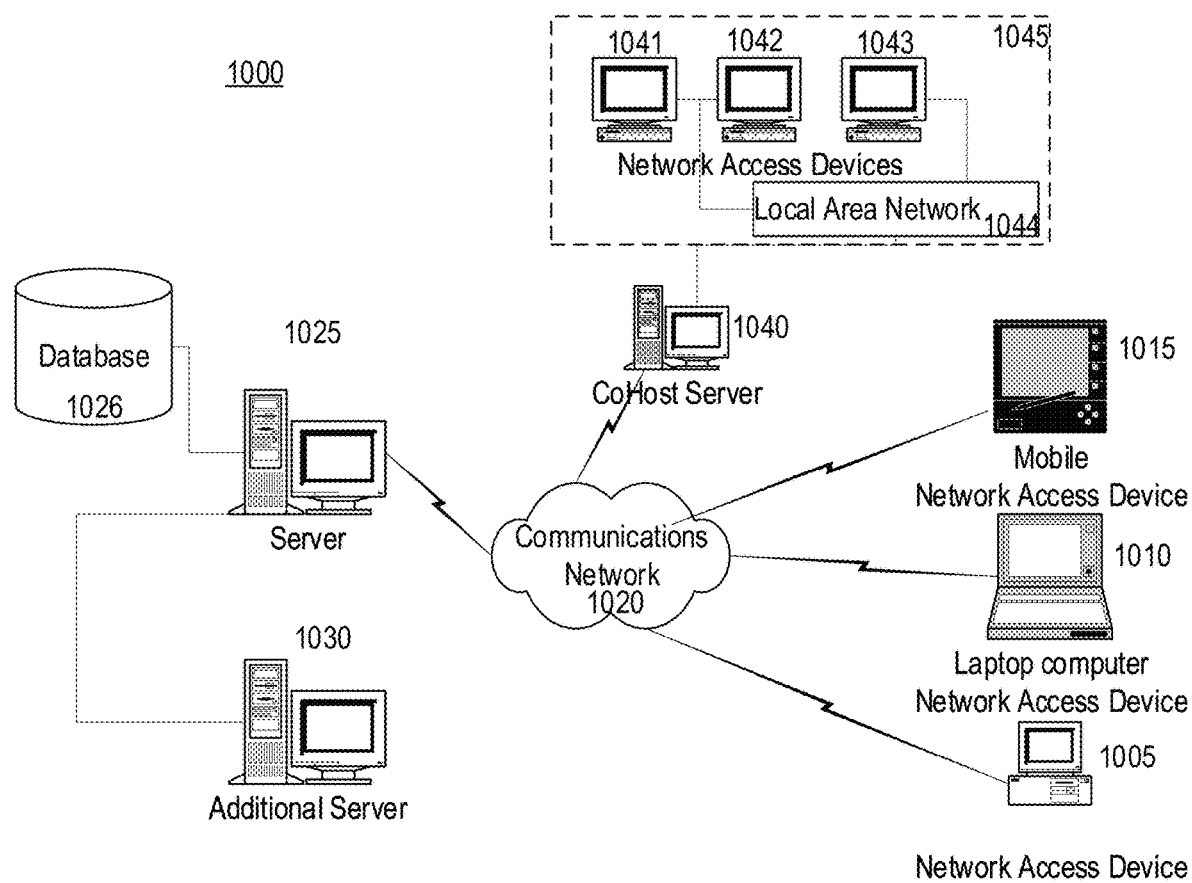
FIG. 10 illustrates an exemplary processing and interface system.

Referring now to FIG. 10, an exemplary processing and interface system 1000 is illustrated. In some aspects, access devices 1015, 1010, 1005, such as a paired portable device 1015 or laptop computer 1010 may be able to communicate with an external server 1025 though a communications network 1020. The external server 1025 may be in logical communication with a database 1026, which may comprise data related to identification information and associated profile information. In some embodiments, the server 1025 may be in logical communication with an additional server 1030, which may comprise supplemental processing capabilities.

In some aspects, the server 1025 and access devices 1005, 1010, 1015 may be able to communicate with a cohost server 1040 through a communications network 1020. The cohost server 1040 may be in logical communication with an internal network 1045 comprising network access devices 1041, 1042, 1043 and a local area network 1044. For example, the cohost server 1040 may comprise a payment service, such as PayPal or a social network, such as Facebook or a dating website.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A system for providing an interactive map, wherein the system comprises:
   a display;
   one or more local input interfaces;
   one or more memory resources comprising:
      a user profile database;
   one or more processors in communication with the display, one or more local input interfaces, and the one or more memory resources, wherein the one or more processors are configured to:
   receive a first set of pin data comprising at least one location;
   identify a first pin area;
   define geofence boundaries of a first pin area, wherein the geofence boundaries of the first pin area are based at least in part on city limits of the at least one location;
   display an interactive map on the display; and
   display a first pin in the interactive map within the first pin area.

2. The system of claim 1, wherein the first set of pin data is received from the one or more local input interfaces.

3. The system of claim 1, wherein the one or more processors are further configured to:
   receive a second set of pin data;
   identify a second pin area; and
   define geofence boundaries of a second pin area.

4. The system of claim 3, wherein the one or more processors are further configured to:
   display a second pin in the interactive map within the second pin area.

5. The system of claim 4, wherein the one or more processors are further configured to:
   remove the first pin from the interactive map.

6. The system of claim 3, wherein the one or more processors are further configured to:
  compare the first pin area to the second pin area, wherein the comparing identifies a proximity between the first pin area and the second pin area; and
  define geofence boundaries of a third pin area based on the comparing of the first pin area and the second pin area, wherein the defining occurs where the proximity is less than a predefined threshold distance.

7. The system of claim 3, wherein the one or more processors are further configured to:
  receive display preferences, wherein providing the interactive map is based at least in part on the display preferences.

8. The system of claim 1, wherein the one or more processors are further configured to:
  associate one or more pin type with the first set of pin data, wherein the first pin is displayed according to at least one of the one or more pin types.

9. The system of claim 8, wherein the first set of pin data further comprises at least one association.

10. A method for displaying an interactive map comprising the method steps of:
  receiving a first set of pin data comprising at least one location;
  identifying a first pin area;
  defining geofence boundaries of a first pin area, wherein the geofence boundaries of the first pin area are based at least in part on city limits of the at least one location;
  displaying an interactive map on the display; and
  displaying a first pin in the interactive map within the first pin area.

11. The method of claim 10, wherein the first set of pin data is received from one or more local input interfaces.

12. The method of claim 10, further comprising the method steps of:
  receiving a second set of pin data;
  identifying a second pin area; and
  defining geofence boundaries of a second pin area.

13. The method of claim 12, further comprising the method steps of:
  displaying a second pin in the interactive map within the second pin area.

14. The method of claim 13, further comprising the method steps of:
  removing the first pin from the interactive map.

15. The method of claim 12, further comprising the method steps of:
  comparing the first pin area to the second pin area, wherein the comparing identifies a proximity between the first pin area and the second pin area; and
  defining geofence boundaries of a third pin area based on the comparing of the first pin area and the second pin area, wherein the defining occurs where the proximity is less than a predefined threshold distance.

16. The method of claim 13, further comprising the method steps of:
  receiving display preferences, wherein providing the interactive map is based at least in part on the display preferences.

17. The method of claim 10, further comprising the method steps of:
  associating one or more pin type with the first set of pin data, wherein the first pin is displayed according to at least one of the one or more pin types.

18. The method of claim 17, wherein the first set of pin data further comprises at least one association.

\* \* \* \* \*